US011244543B2

(12) United States Patent
Makley et al.

(10) Patent No.: US 11,244,543 B2
(45) Date of Patent: Feb. 8, 2022

(54) OPERATING A SELF-CHECKOUT STATION

(71) Applicant: Toshiba Global Commerce Solutions Holdings Corporation, Tokyo (JP)

(72) Inventors: Hye Suk Makley, Morrisville, NC (US); Craig Turner, Raleigh, NC (US); Anna Maria Britain, Mobile, AL (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 27 days.

(21) Appl. No.: 16/366,563

(22) Filed: Mar. 27, 2019

(65) Prior Publication Data
US 2020/0312100 A1 Oct. 1, 2020

(51) Int. Cl.
G07G 1/00 (2006.01)
G05B 15/02 (2006.01)
G07G 1/12 (2006.01)

(52) U.S. Cl.
CPC .......... *G07G 1/0018* (2013.01); *G05B 15/02* (2013.01); *G07G 1/12* (2013.01)

(58) Field of Classification Search
CPC .............................. G07G 1/0018; G07G 1/12
See application file for complete search history.

(56) References Cited

U.S. PATENT DOCUMENTS

| 3,990,540 A | 11/1976 | Aleshire et al. |
| 5,497,853 A * | 3/1996 | Collins, Jr. ............. A47F 9/047 186/61 |
| 5,967,263 A | 10/1999 | Ariga |
| 6,991,066 B2 | 1/2006 | Persky |
| 7,386,472 B1 | 6/2008 | Bogat |
| 7,516,818 B2 | 4/2009 | Harris et al. |
| 9,457,965 B2 | 10/2016 | Baitz et al. |
| 10,073,996 B2 | 9/2018 | Ferrer Alos |
| 10,515,309 B1 * | 12/2019 | McNamara ............ G01G 19/52 |
| 2005/0167202 A1 | 8/2005 | Layne |
| 2006/0180662 A1 | 8/2006 | Pirruccio |
| 2006/0243798 A1 * | 11/2006 | Kundu ...................... G06T 7/00 235/383 |
| 2007/0051561 A1 * | 3/2007 | Harris ...................... A47F 9/04 186/59 |

(Continued)

FOREIGN PATENT DOCUMENTS

| EP | 2984970 A1 | 2/2016 |
| EP | 1740076 B1 | 6/2016 |

(Continued)

OTHER PUBLICATIONS

Toshiba, et al., "Toshiba Self-Checkout System 7", pp. 1-4, retrieved on Nov. 9, 2018, retrieved from internet: http://tgcs04.toshibacommerce.com/cs/groups/internet/documents/document/a291/df91/~edisp/system_7_self_checkout_usen.pdf.

(Continued)

*Primary Examiner* — Nathan L Laughlin
(74) *Attorney, Agent, or Firm* — Coats + Bennett, PLLC

(57) ABSTRACT

A self-checkout (SCO) station for a retail store has a reconfigurable bagging section that receives items scanned by a user. The SCO station determines whether the user does or does not require the SCO station to operate in a mode that complies with the requirements of the Americans with Disabilities Act (ADA). If so, the SCO station automatically reconfigures the bagging section to ensure that the user is able to reach all items in the bagging section.

20 Claims, 10 Drawing Sheets

(56) References Cited

U.S. PATENT DOCUMENTS

| | | | |
|---|---|---|---|
| 2009/0090584 A1* | 4/2009 | Chakra | G06Q 30/02 186/61 |
| 2014/0129362 A1 | 5/2014 | Marquis et al. | |
| 2015/0083523 A1 | 3/2015 | Johnson et al. | |
| 2015/0194023 A1 | 7/2015 | Brackenridge et al. | |
| 2015/0272349 A1 | 10/2015 | Seljeseth | |
| 2016/0132822 A1 | 5/2016 | Swafford | |
| 2017/0254071 A1 | 9/2017 | Leaverton et al. | |
| 2018/0232796 A1 | 8/2018 | Glaser et al. | |
| 2018/0293567 A1 | 10/2018 | Seljeseth | |
| 2018/0354139 A1* | 12/2018 | Wang | G06Q 30/0635 |

FOREIGN PATENT DOCUMENTS

| | | |
|---|---|---|
| EP | 3168177 A1 | 5/2017 |
| GB | 2284088 A | 5/1995 |
| WO | 2018002864 A1 | 1/2018 |

OTHER PUBLICATIONS

Fukushima, K. et al., "Panasonic introduces robotic checkout at a grocery store in Osaka", Dec. 14, 2016, pp. 1-4, retrieved on Nov. 9, 2018, retrieved from internet: https://www.cnbc.com/2016/12/14/panasonic-introduces-robotic-checkout-at-a-grocery-store-in-osaka.html.

Proquest, "Wincor Nixdorf enables retailers to implement "Always Open" checkout while expanding its innovative and fully ADA II compliant automated checkout portfolio", M2 Presswire, Dec. 21, 2012, pp. 1-3, Retrieved from ProQuest Dialog on Nov. 9, 2018: https://dialog.proquest.com/professional/docview/1242377284?accountid=157282.

Proquest, "IBM Introduces Retail's First Completely Modular Self-Checkout System", Targeted News Service [Washington, D.C], Jan. 11, 2011, pp. 1-3, Retrieved from ProQuest Dialog on Nov. 9, 2018: https://dialog.proquest.com/professional/docview/1242377284?accountid=157282.

Emerging Technologies, et al., "PCI Mobile Payment Acceptance Security Guidelines for Merchants as End-Users", Feb. 1, 2013, pp. 1-28, retrieved on Mar. 27, 2019, retrieved from internet: https://www.pcisecuritystandards.org/documents/Mobile_Payment_Security_Guidelines_Merchants_v1.pdf.

Kyle, "The 7 Brock & Mortar Retailers Offering Mobile Checkout", Apr. 10, 2018, pp. 1-6, online blog, obtained on Mar. 27, 2019, obtained from internet: https://www.rather-be-shopping.com/blog/2018/04/10/retailers-offeringmobile-checkout/.

* cited by examiner

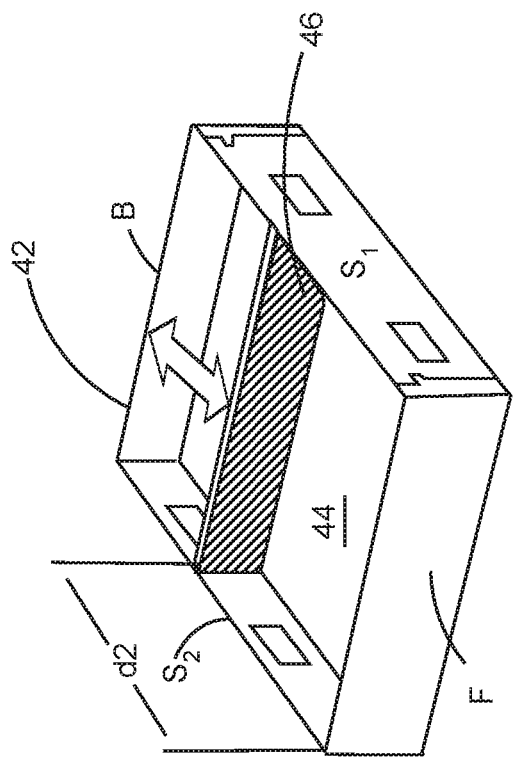
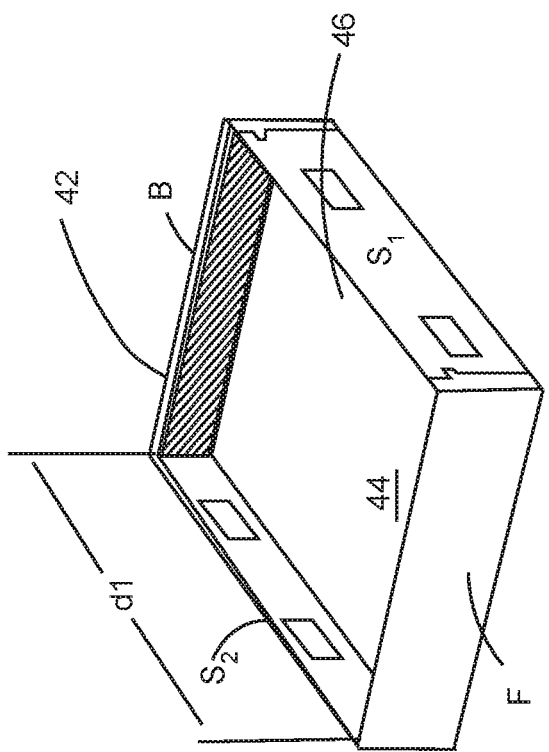
FIG. 4A
FIG. 4B

68

```
PROCESSING CIRCUITRY
60

ADA COMPLIANCE DETERMINATION MODULE/UNIT
    80

CONTROL SIGNAL GENERATION MODULE/UNIT
    82

PARTITION POSITION CONTROL MODULE/UNIT
    84

CUSTOMER COMPLETE DETERMINATION MODULE/UNIT
    86
```

FIG. 10

OPERATING A SELF-CHECKOUT STATION

TECHNICAL FIELD

The present disclosure relates generally to checkout stations for retail businesses, and more particularly to self-checkout (SCO) stations capable of operating in compliance with the Americans with Disabilities Act (ADA) of 1990.

BACKGROUND

Many retailers utilize self-checkout (SCO) stations as an alternative to conventional attendant-assisted checkout lanes. As is known in the art, SCO stations allow customers to process their own purchases. Particularly, customers use a SCO station to scan, and sometimes weigh, the items they would like to purchase before placing the items in a bagging area. Once all items have been scanned, customers utilize the SCO station to apply payment.

While useful, SCO stations are not always convenient and easy-to-use for all customers. For example, due to their limited reach, disabled customers, such as those confined to a wheelchair, can have a difficult time retrieving items from the bagging area. The Americans with Disabilities Act (ADA) of 1990 defines limitations on the height and depth of SCO stations to ensure that disabled customers have an easier time reaching their items in the bagging area. However, not only do such federal regulations complicate the design of SCO stations, but they also make the SCO stations more costly to manufacture and sell.

BRIEF DESCRIPTION OF THE DRAWINGS

FIGS. 2A-6B are perspective views of a bagging section configured according to embodiments of the present disclosure.

FIG. 10 is a schematic block diagram a computer program product configured to automatically configure a bagging section of an SCO station according to one embodiment of the present disclosure.

DETAILED DESCRIPTION

Embodiments of the present disclosure provide a SCO station that automatically adjusts the maximum "reach-depth" of its bagging section depending on whether the customer currently using the SCO station is an able-bodied person, or a disabled person covered under the provisions of the Americans with Disabilities Act (ADA) of 1990 (i.e., 42 U.S. Code § 12101 et seq.) and its subsequent amendments enacted in Jan. 1, 2009. Within the context of this disclosure, a "reach-depth" is defined as being the horizontal distance as measured from a front of the bagging section of an SCO station to a rear of the bagging section. For disabled customers, such as those in a wheelchair for example, the maximum reach-depth is defined in section 308.3.2 of the Department of Justice ADA Standards (2010) as being no more than 24 inches. For able-bodied persons, however, the maximum reach-depth is permitted to be more than 24 inches. As described later in more detail, adjusting the maximum reach-depth of the bagging section, as in the present embodiments, makes it easier for disabled customers positioned at the front of the SCO station, especially those in a wheelchair, to reach all of the items placed into the bagging section after scanning. In addition, such adjustments help to ensure that the SCO station is ADA compliant while minimizing costs for design and manufacture.

Figure 1:
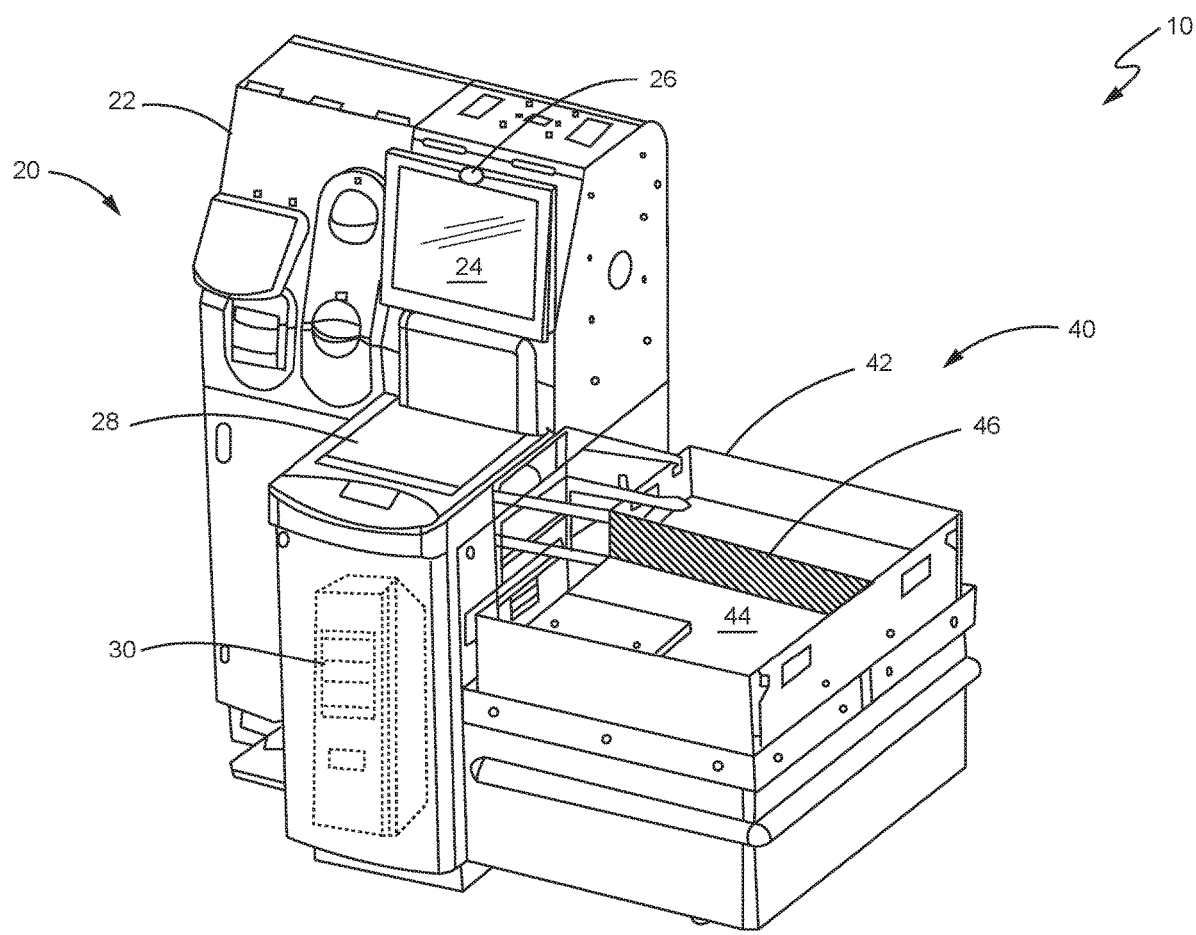
FIG. 1 is a perspective view illustrating a self-checkout (SCO) station configured according to one embodiment of the present disclosure.

Referring now to the drawings, FIG. 1 is a perspective view of an SCO station 10 configured according to one embodiment of the present disclosure. As seen in FIG. 1, SCO station 10 comprises, inter alia, a terminal section 20 and a bagging section 40 that can be automatically reconfigured to be compliant with the provisions of the ADA.

The terminal section 20 comprises a payment processing unit 22 for facilitating customer payment, a display 24 for displaying information associated with the items being purchased to the customer, a non-contact sensor 26 for determining whether a customer is an "ADA customer" (defined herein as a person protected by the provisions of the ADA) or a "non-ADA customer" (defined herein as an able-bodied person not protected by the provisions of the ADA), a scanner/scale 28 for allowing the customer to scan and/or weigh an item he/she wishes to purchase, and a computer 30. As described in more detail later, not only is computer 30 configured to control the operation of the terminal section 20, but it is also configured to determine whether the SCO station 10 should be ADA compliant, and automatically control the configuration of the bagging section 40 accordingly.

In this embodiment, the bagging section 40 comprises a peripheral wall 42 extending around a receiving area 44 having a generally flat bottom surface and a reconfigurable partitioning member configured to partition the receiving area 44 of bagging section 40 into at least two separate areas. In the embodiments disclosed herein, the partitioning member comprises a reconfigurable partition wall 46.

The receiving area 44 is configured to receive items after they have been scanned by the customer using scanner/scale 28. The partition wall 46, according to the present embodiments, deploys between a first non-ADA compliant position in which a reach-depth of the bagging section 40 is greater than 24 inches, and a second ADA compliant position in which the reach-depth of the bagging section 40 is not greater than 24 inches.

In operation, when a customer approaches SCO station 10 to begin a transaction, sensor 26 determines whether the customer is/is not an "ADA customer." In one embodiment, such a decision is made based on a detected height of the customer. Particularly, sensor 26, which may comprise any measurement sensor or other non-contact sensor known in the art, scans the area in front of SCO station 10 and provides the resultant raw scan data to computer 30. Upon receipt, computer 30 processes the raw data to determine the customer's height. Based on the determined height of the customer, computer 30 adjusts the maximum reach-depth of the bagging section 40. In particular, computer 30 generates control signals to reposition the partition wall 46 in bagging section 40 between a first position in which bagging section 40 is "non-ADA compliant" (i.e., where the maximum reach-depth of the bagging section 40 is more than 24 inches), and a second position in which bagging section 40 is "ADA-compliant" (i.e., where the maximum reach-depth of the bagging section 40 is not more than 24 inches).

Figure 2B:
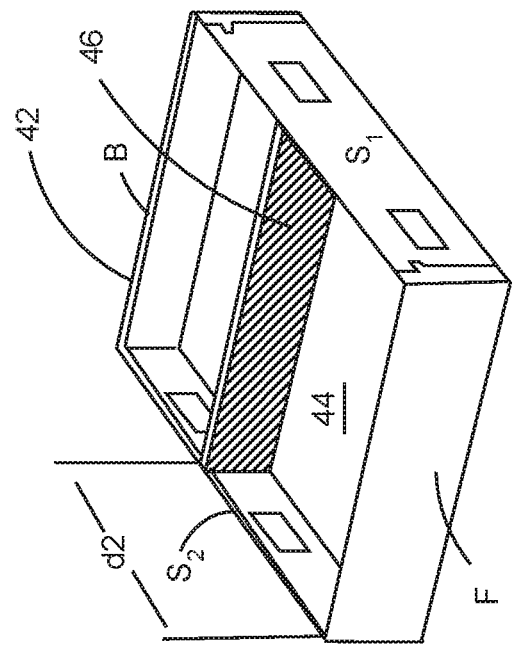
Figure 2A:
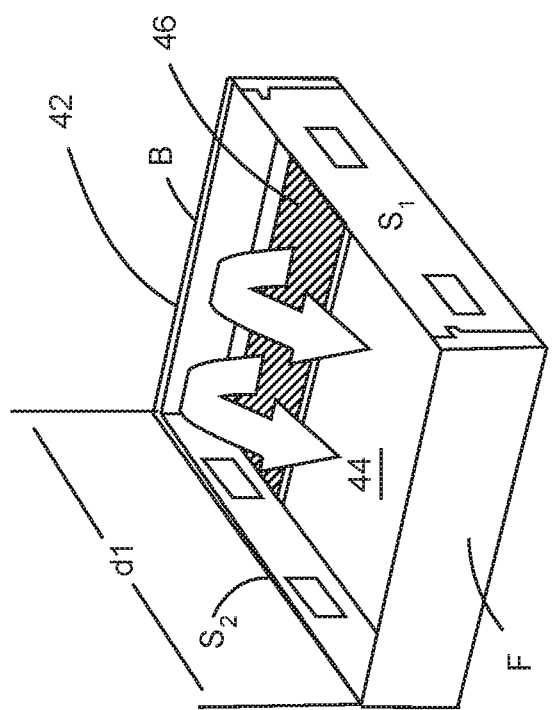

FIGS. 2A-2B are perspective views illustrating a bagging section 40 configured to be automatically reconfigured to operate in a non-ADA compliant mode (FIG. 2A) and an ADA compliant mode (FIG. 2B) according to one embodiment of the present disclosure. As seen in FIGS. 2A-2B, the peripheral wall 42 comprises opposing front and back walls F, B, respectively, and opposing side walls $S_1$, $S_2$. As previously stated, computer 30 generates control signals that cause the partition wall 46 to move between a first position in which the bagging section does not comply with the provisions of the ADA (FIG. 2A) and a second position in which the bagging section does comply with the provisions of the ADA (FIG. 2B).

In FIG. 2A, for example, partition wall 46 is oriented horizontally and lies flat against the bottom surface of receiving area 44. In this position, the maximum reach-depth $d_1$ of the bagging section 40 is greater than 24 inches, and thus, the bagging section 40 is non-ADA compliant. So configured, non-ADA customers are able to reach all of the items in the bagging section 40, even when those items are placed against the back wall B of bagging section 40. However, because the horizontal reach of most ADA customers is limited (e.g., customers confined to a wheelchair), ADA customers may not able to easily reach all the items placed in the bagging section 40 of FIG. 2A—especially when those items are against the back wall B of bagging section 40. Therefore, as seen in FIG. 2B, computer 30 decreases the maximum reach-depth of the bagging section 40 from $d_1$ to $d_2$. To accomplish this, computer 30 generates control signals that cause partition wall 46 to "flip" or "rotate" from the first position into the second position. In this second position, partition wall 46 is oriented substantially vertically with respect to the bottom surface of receiving area 44 thereby reducing the maximum reach-depth $d_2$ of bagging section 40 to no more than 24 inches. The bagging section 40 therefore is automatically adjusted to comply with the requirements of the ADA, and thus, an ADA customer is able to reach all the items in the bagging section 40. When a non-ADA customer utilizes the SCO station 10, computer 30 returns partition wall 46 to the first position. Particularly, computer 30 generates additional control signals to cause partition wall 46 to flip or rotate downwardly against the bottom surface of receiving area 44, thereby increasing the maximum reach-depth of bagging section 40 from $d_2$ to $d_1$.

As those of ordinary skill in the art will readily appreciate, there are a variety of known mechanisms that can be utilized to move the partition wall 46 between the first and second positions, thereby increasing and decreasing the maximum reach-depth of bagging section 40. One embodiment of the present disclosure, for example, utilizes a motor (not shown) that flips the partition wall 46 between the first and second positions responsive to receiving the control signals from computer 30. In such embodiments, one or more mechanical members (e.g., telescoping arms) may operatively attach the motor to the partition wall 46. Responsive to receiving signals indicating that the bagging section 40 should be reconfigured to be ADA compliant (i.e., to decrease the maximum reach-depth of the bagging section from $d_1$ to $d_2$), the motor operates to extend the one or more mechanical members to flip the partition wall 46 into the second position (FIG. 2B). Upon receiving signals indicating that the bagging section 40 should be reconfigured to be non-ADA compliant (i.e., to increase the maximum reach-depth of the bagging section from $d_2$ to $d_1$), the motor operates to retract the one or more mechanical members to flip the partition wall 46 back into the first position (FIG. 2A).

Another embodiment of the present disclosure utilizes biasing members, such as springs (not shown), operatively connected to the partition wall 46 that normally bias the partition wall 46 into the first position (FIG. 2A). Upon receiving control signals from computer 30 indicating that the bagging section 40 should be reconfigured to be ADA compliant, the motor exerts a force on the partition wall 46 that overcomes the biasing force and flips or rotates the partition wall 46 into the second position (FIG. 2B). Upon receiving signals indicating that the bagging section 40 should be reconfigured to be ADA compliant, however, the motor releases the force applied to the partition wall 46 maintaining it in the second position, thereby allowing the biasing members to bias the partition wall 46 back into the first position (FIG. 2A).

Figure 3B:
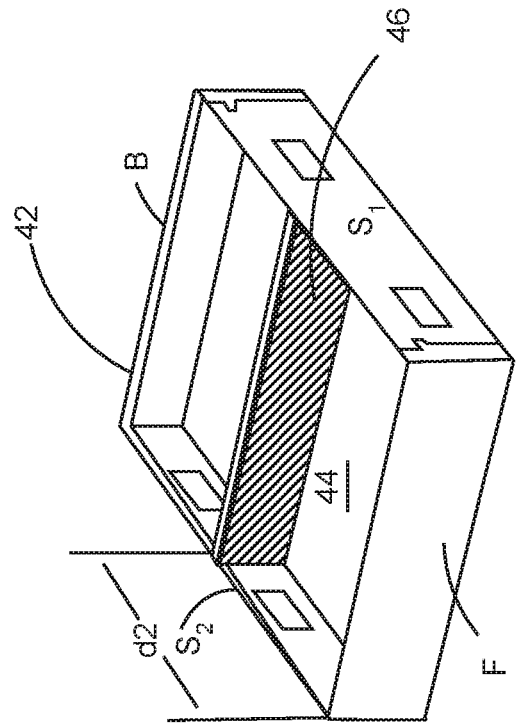
Figure 3A:
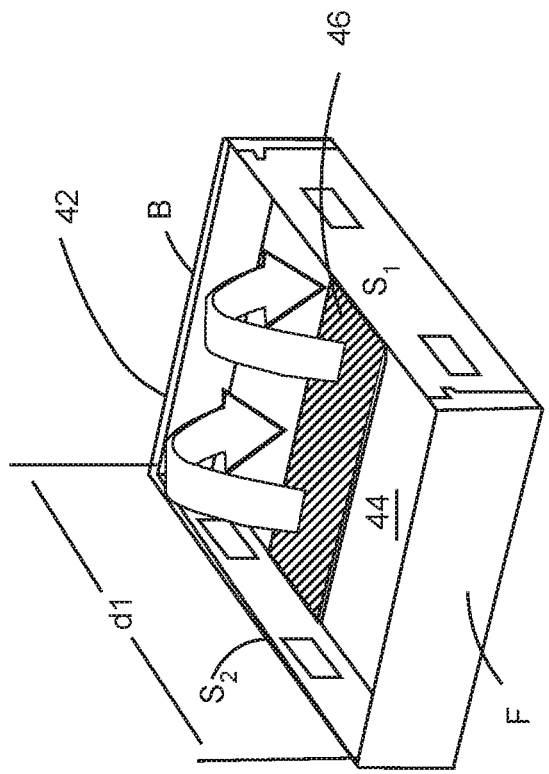

FIGS. 3A-6B are perspective views illustrating bagging section 40 configured according to other embodiments of the present disclosure. Particularly, FIGS. 3A-3B illustrate an embodiment in which partition wall 46 flips or rotates in a direction opposite of that seen in FIGS. 2A-2B. In this embodiment, partition wall 46 flips or rotates between the first position, in which the partition wall 46 lies flat against the bottom surface of receiving area 44 (FIG. 3A), and the second position, in which the partition wall 46 is in a substantially vertical position relative to the bottom surface of receiving area 44.

FIGS. 4A-4B are perspective views of bagging section 40 illustrating an embodiment in which the partition wall 46 slides horizontally between the first and second positions. In the first position, partition wall 46 contacts or is proximate a surface of the back wall B of bagging section 40 (FIG. 4A). In the second position, the partition wall 46 is spaced away from the back wall B of the bagging section (FIG. 4B). Computer 30 generates the control signals required to move partition wall 46 horizontally between the first and second positions to adjust the maximum reach-depth of bagging section 40.

Figure 5A:
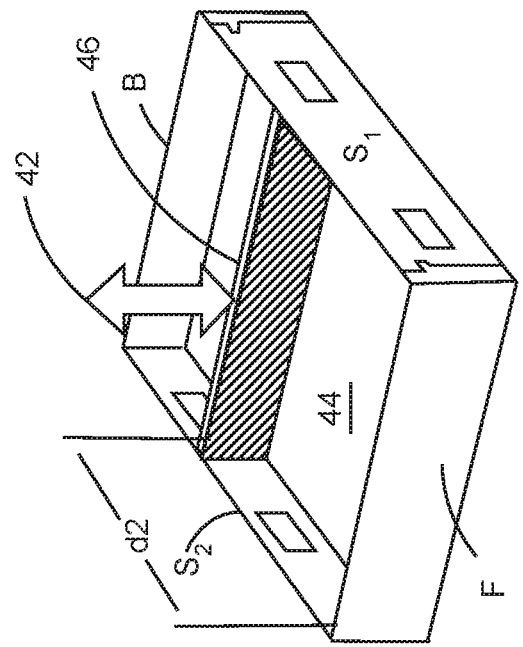
Figure 5B:
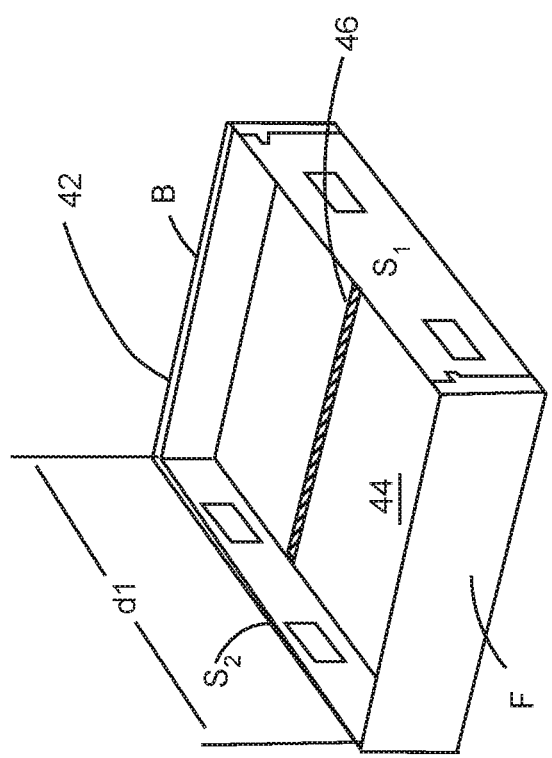

FIGS. 5A-5B are perspective views of bagging section 40 in which the partition wall 46 moves vertically between the first and second positions. In this embodiment, the partition wall 46 may be recessed into a slot or other elongated receptacle formed in the bottom surface of receiving area 44 (FIG. 5A). As stated above, bagging section 40 is non-ADA compliant when partition wall 46 is in this first position. Responsive to receiving control signals indicating that the bagging section 40 should be reconfigured to be ADA compliant, however, the partition wall 46 is raised vertically out of the slot so as to adjust the bagging section 40 to be ADA compliant.

Figure 6A:
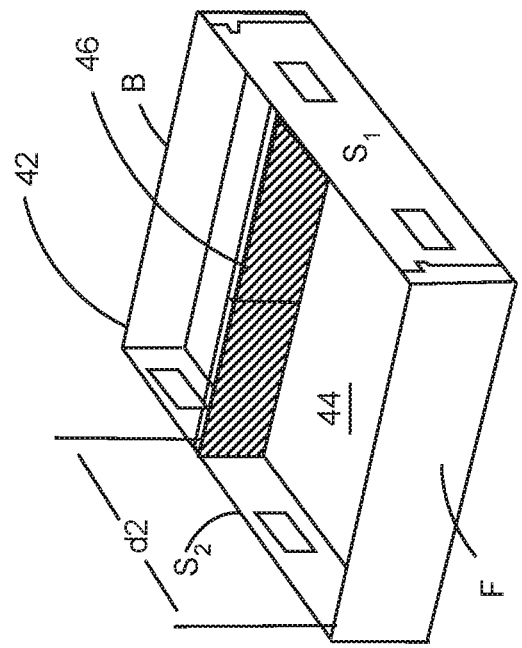
Figure 6B:
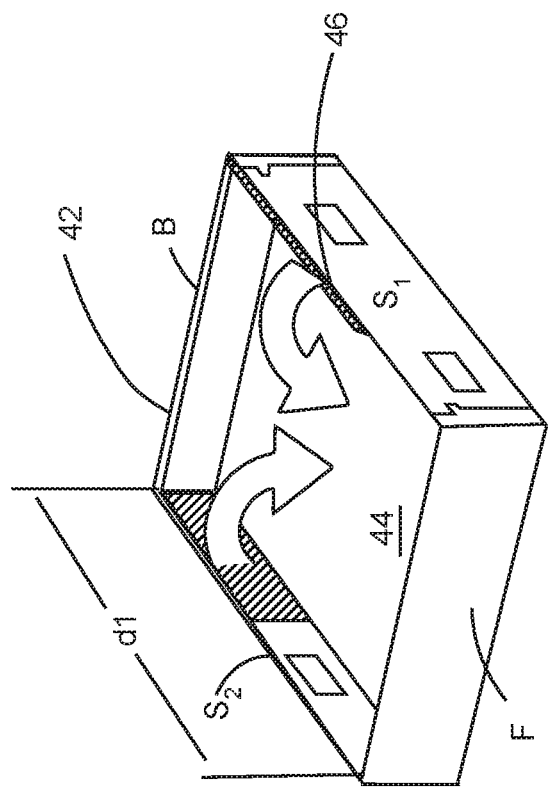

FIGS. 6A-6B are perspective views of bagging section 40 in which partition wall 46 comprises two walls 46a, 46b— each of which is pivotably attached to a respective side $S_1$, $S_2$ of peripheral wall 42 of bagging section 40 (FIG. 6A). In this position, bagging section 40 is non-ADA compliant. However, responsive to receiving signals indicating that the bagging section 40 should be reconfigured to be ADA compliant, the control signals generated by the computer 30 cause the partition walls 46a, 46b to pivot or rotate outwardly from the sides $S_1$, $S_2$ of peripheral wall 42 such that bagging section 40 becomes ADA compliant (FIG. 6B).

It should be noted that while FIGS. 2A-6B show various embodiments of the present disclosure, the control signals generated by computer 30 in each embodiment automatically increase or decrease the maximum reach-depth of bagging section 40 between $d_1$ and $d_2$. As stated previously, with the maximum reach-depth at $d_1$ (i.e., greater than 24 inches), the entirety of the bagging section 40 is available to non-ADA customers. With the maximum reach-depth at $d_2$, (i.e., not more than 24 inches), however, ADA customers are able to reach all of the items placed into the bagging section 40 after scanning.

Figure 7:
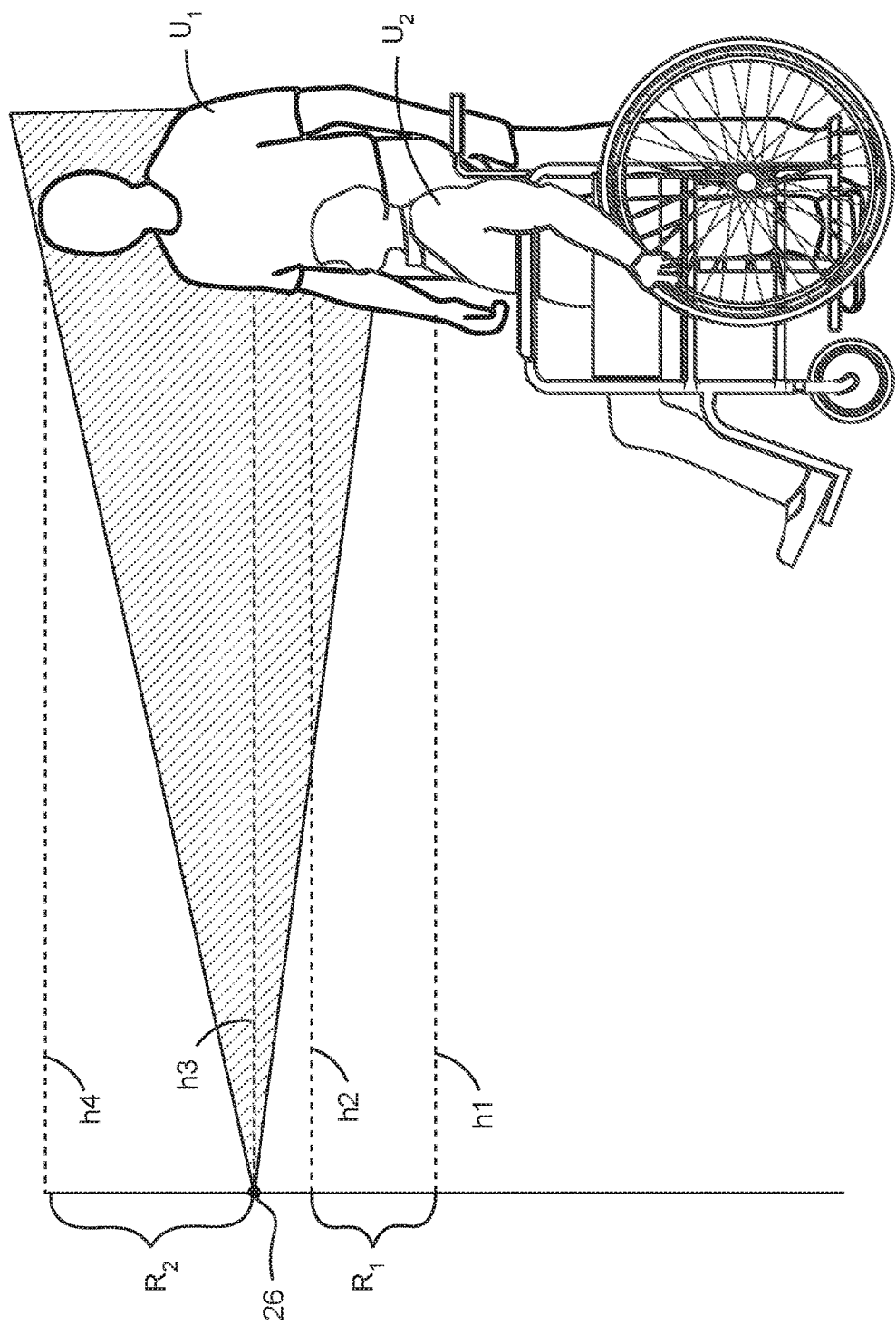
FIG. 7 is a perspective view illustrating how an SCO station determines whether a customer is or is not an ADA customer according to one embodiment of the present disclosure.

FIG. 7 is a perspective view illustrating how computer 30 determines whether a customer is or is not an ADA customer according to one embodiment of the present disclosure. FIG. 7 illustrates an example of a non-ADA customer $U_1$ and an ADA customer $U_2$. Typically, when seated, ADA customers $U_2$ have a ground to head height that is within a first range $R_1$ regardless of whether they are male or female. As seen in FIG. 7, range $R_1$ is bounded by predefined lower and upper height thresholds $h_1$ (about 41 inches) and $h_2$ (about 51 inches), respectively. Therefore, if sensor 26 detects the presence of a customer within range $R_1$, computer 30 can determine that the user is likely an ADA customer $U_2$.

Non-ADA customers $U_2$ will typically have a ground to head height that is within a second range $R_2$ regardless of whether they are male or female. In this embodiment, range $R_2$ is bounded by predefined lower and upper height thresholds $h_3$ (about 56 inches) and $h_4$ (about 70 inches), respectively. Therefore, if sensor 26 detects the presence of a customer within range $R_2$, computer 30 might determine that the user is likely a non-ADA customer $U_1$.

In one embodiment, sensor 26 is positioned on the SCO station 10 such that it is able to scan at least portions of both ranges $R_1$ and $R_2$. If sensor 26 detects a customer within range $R_1$ but not $R_2$ (i.e., there is an absence of the customer in range $R_2$), computer 30 can determine that the customer is likely an ADA customer $U_2$ and generate the control signals needed to decrease the maximum reach depth of bagging section 40. Similarly, computer 30 can determine that the customer is likely an ADA customer $U_2$ r if the customer is detected in range $R_1$ or if there is an absence of the customer detected in range $R_2$. Alternatively, if sensor 26 detects the presence of a customer in range $R_2$, computer 30 can determine that the customer is likely a non-ADA customer, and therefore, generate the control signals needed to increase the maximum reach-depth of bagging section 40.

Those of ordinary skill in the art will readily appreciate that the particular threshold values stated above for $h_1$-$h_4$ are illustrative only. The actual values can change and are not based solely on anthropomorphic factors. Rather, the values for $h_1$-$h_4$ can depend on other variables such as the distance between the customer and the camera capturing the images, the height and placement of the camera relative to the user, camera specifications, and the like. Thus, as one or more of these variables are changed, the values for one or more of the thresholds for $h_1$-$h_4$ may also change accordingly.

Figure 8:
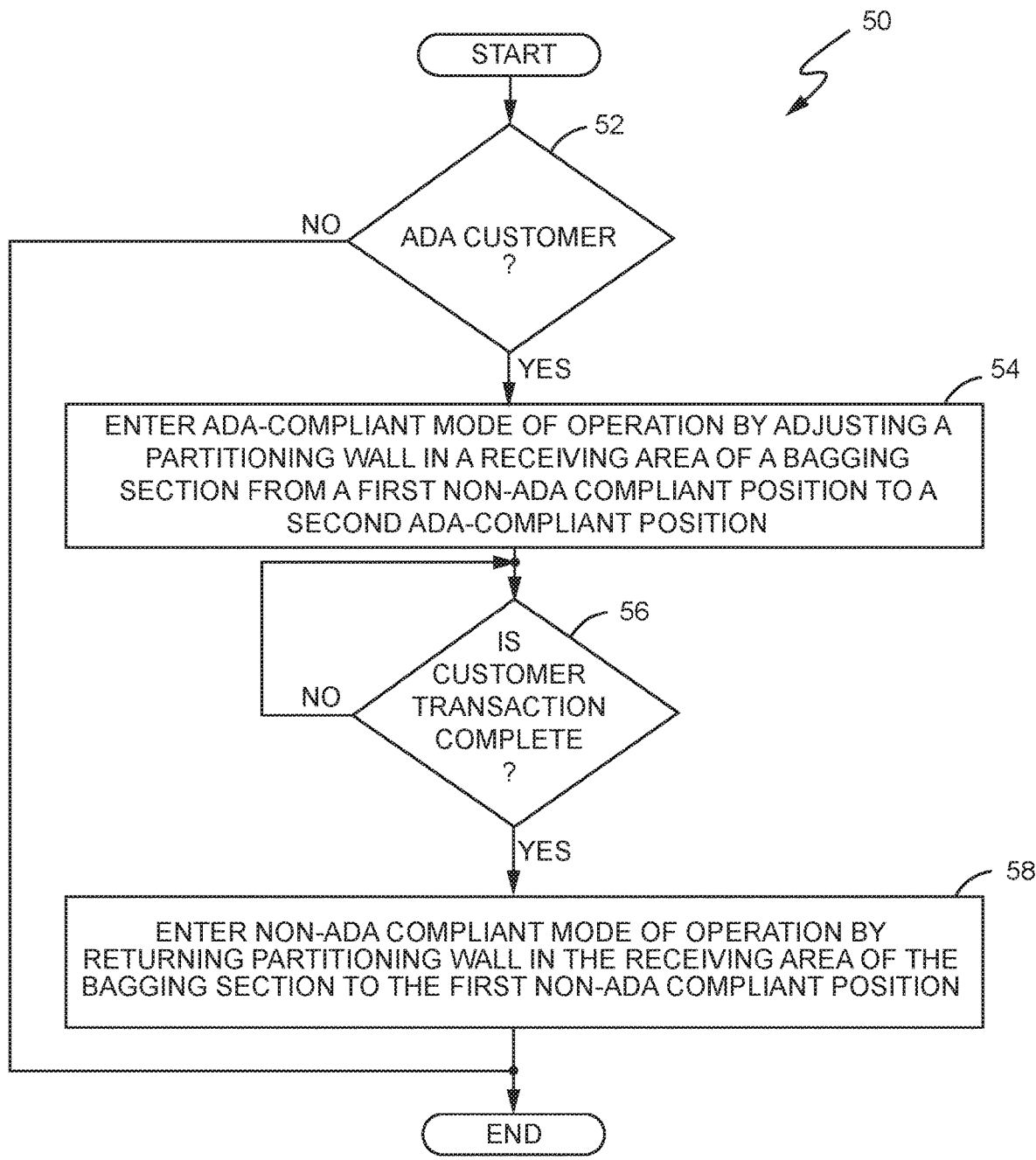
FIG. 8 is a flow diagram illustrating a method for automatically configuring a bagging section of an SCO station to operate between an ADA compliant mode and a non-ADA compliant mode according to one embodiment of the present disclosure.

FIG. 8 is a flow diagram illustrating a method 50 for automatically adjusting an SCO station 10 according to one embodiment of the present disclosure. In this embodiment, it is assumed that bagging section 40 is initially non-ADA compliant; however, this is for clarity and ease of discussion only.

Method 50 begins with computer 30 making a determination as to whether a customer using SCO station 10 is an ADA customer $U_2$ or a non-ADA customer $U_1$ (box 52). As previously explained in connection with the embodiment of FIG. 7, that determination may be based on a sensed height of the customer being within one of two predefined height ranges $R_1$ or $R_2$. If computer 30 determines that the customer is a non-ADA customer $U_1$, method 50 ends as bagging section 40 is already non-ADA compliant. However, if computer 30 determines that the customer is an ADA customer $U_2$, computer 30 places the bagging section 40 into the ADA compliant mode by adjusting the partition wall 46 from the first non-ADA compliant position to a second ADA compliant position (box 54). That is, the control signals generated by computer 30 decrease the maximum reach depth of bagging section 40 from $d_1$ to $d_2$.

The bagging section 40 remains ADA compliant until computer 30 determines that the transaction is complete (box 56). When this occurs, computer 30 will generate the control signals required to place bagging section 40 back into the non-ADA compliant mode by adjusting the partition wall 46 in the receiving area of the bagging section 40 from the second ADA compliant position to the first non-ADA compliant position (box 58). That is, the control signals generated by computer 30 increase the maximum reach depth of bagging section 40 from $d_2$ to $d_1$.

It should be noted that the present disclosure is not limited to determining whether a customer is an ADA customer or a non-ADA customer based solely on the customer's height. For example, another embodiment of the present disclosure configures computer 30 to identify the user. In these embodiments, computer 30 is configured to analyze an image of the customer, or alternatively, obtain the results of such an analysis, and identify the customer based on that analysis. Computer 30 can then determine, based on the identity, whether that customer is an ADA customer or a non-ADA customer.

In another embodiment, the present disclosure configures computer 30 to make the determination based on information obtained from the customer. Such information may, for example, be entered manually by the customer at the SCO station 10, or be obtained from a loyalty card scanned by the customer at SCO station 10, or from the customer's mobile device. In these latter embodiments, the customer's mobile device (e.g., a SMARTPHONE) could establish a short-range wireless communications link with a transceiver associated with the retail store (e.g., with the SCO station 10) and provide that transceiver with information that identifies one or both of the customer and the customer's SMARTPHONE. In some embodiments, computer 30 has access to a database where information associated with the customer's loyalty profile is maintained. Upon obtaining the information, computer 30 could access the database to identify the user and/or determine whether the customer is or is not an ADA customer based on whether the obtained information matches the information stored in the database.

Figure 9:
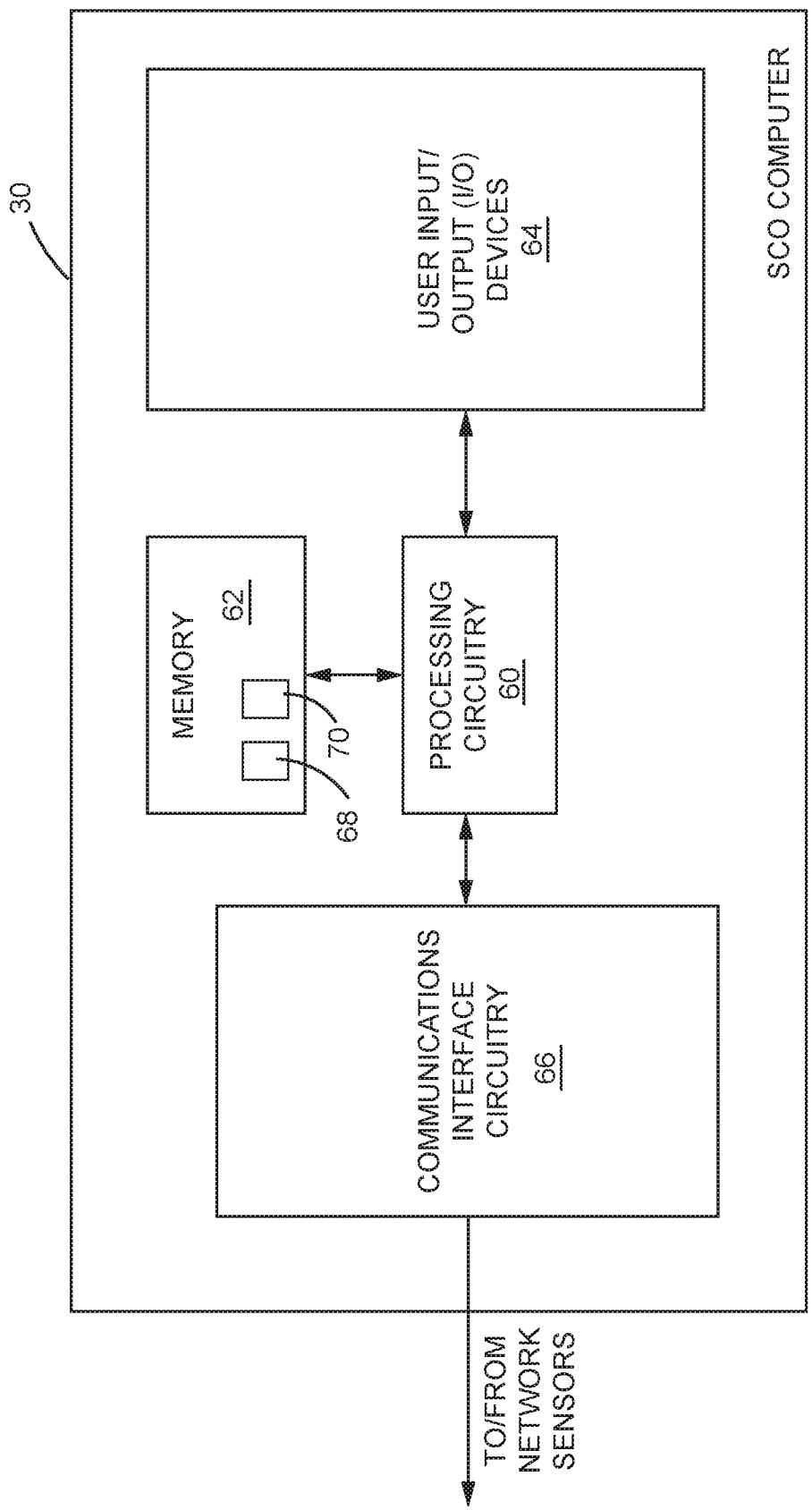
FIG. 9 is a functional block diagram illustrating a computer configured to automatically configure a bagging section of an SCO station according to one embodiment of the present disclosure.

FIG. 9 is a schematic block diagram illustrating the main functional components of computer 30 according to one embodiment of the present disclosure. As seen in FIG. 9, computer 30 comprises processing circuitry 60, memory 62, a user input/output (I/O) interface 64, and a communications interface circuit 66.

Processing circuitry 60 comprises one or more microprocessors, hardware circuits, firmware or a combination thereof. In the exemplary embodiments described herein, processing circuitry 60 is configured to control the operation and functioning of SCO station 10. Additionally, processing circuitry 60 is also configured to determine that a customer is an ADA customer $U_2$, and responsive to the determining, decrease a maximum reach-depth of bagging section 40 from a first depth $d_1$ in which the user will be unable to reach all the items in bagging section 40 to a second depth $d_2$ in which the user will be able to reach all the items in bagging section 40. If processing circuitry 60 determines that the user is not an ADA customer (i.e., the user is an able-bodied person capable of reaching all items in bagging section 40 of SCO station 10), processing circuitry 60 is configured to increase the maximum reach-depth of bagging section 40 from the second depth $d_2$ to the first depth $d_1$, as previously described.

Memory 62 comprises a non-transitory computer readable medium that stores executable program code and data used by the processing circuitry 60 for operation. In this embodiment, the program code and data comprises a control program 68 that, when executed by processing circuitry 60, configures computer 30 to perform the functions previously described. In some embodiments, control program 68 has access to user profile information 70 that, as previously described, can be utilized to identify whether a given customer is or is not an ADA customer. Memory 62 may include both volatile and non-volatile memory, and may comprise random access memory (RAM), read-only memory (ROM), and electrically erasable programmable ROM (EEPROM) and/or flash memory. Additionally or alternatively, memory 62 may comprise discrete memory devices, or be integrated with one or more microprocessors in the processing circuitry 60.

The user I/O interface 64 comprises, in one or more embodiments, one or more input devices and display devices to enable a user, such as a store associate or operator, for example, to interact with and control computer 30. Such devices may comprise any type of device for inputting data into a computing device including, but not limited to, keyboards, number pads, push buttons, touchpads, touchscreens, or voice activated inputs. The display devices that comprise user I/O interface 64 may comprise, for example, a liquid crystal display (LCD) or light emitting diode (LED) display. In some embodiments, the display device may comprise a touchscreen display that also functions as a user input device.

The communications interface circuit 66 comprises, in one embodiment, a transceiver circuit and/or interface circuit for communicating with remote devices over a communication network or direct communication link. For example, the communications interface circuit 66 may comprise a WiFi interface, a cellular radio interface, a BLUETOOTH interface, an Ethernet interface, or other similar interface for communicating over a communication network or a wireless communication link. Computer 30 may use the communications interface circuit 66, for example, to communicate with the components of the terminal section 20, such as sensor 26, for example, as well as with a communications network, a database storing customer profiles, other remote computing devices, and one or cameras that capture images of customers using SCO station 10, as previously described.

FIG. 10 is a schematic block diagram illustrating a computer program product, such as control program 68. As stated above, control program 68 comprises executable code that, when executed by processing circuitry 60, causes computer 30 to determine whether a given customer is or is not an ADA customer, and to automatically adjust the maximum reach-depth d of the bagging section 40 based on that decision, as previously described. As seen in FIG. 10, the control program 68 may be embodied in a non-transitory, computer-readable medium, such as the memory 62 of computer 30, or alternatively, in a removable memory device, such as a thumb drive or disc.

Control program 68 in this embodiment comprises an ADA compliance determination module/unit 80, a control signal generation module/unit 82, a partition position control module/unit 84, and a customer complete determination module/unit 86.

The ADA compliance determination module/unit 80 comprises program code that is executed by processing circuitry 60 to determine whether a given customer currently using SCO station 10 is an ADA customer or a non-ADA customer. As previously described, the determination may be based on data provided by sensor 26, an analysis performed on an image of the given customer at SCO station 10, or on customer profile information either entered by the given customer or obtained when the customer scans a loyalty card at SCO station 10. The control signal generation module/unit 82 comprises program code executed by processing circuitry 60 to generate one or more control signals based on the results provided by the ADA compliance determination module/unit 80. Particularly, the control signal generation module/unit 82 generates a first set of one or more control signals to cause bagging section 40 to decrease its maximum reach depth from $d_1$ to $d_2$ when the ADA compliance determination module/unit 80 indicates that the given customer is an ADA customer $U_2$, and a second set of one or more control signals to cause bagging section 40 to increase its maximum reach depth from $d_2$ to $d_1$ when the ADA compliance determination module/unit 80 indicates that the given customer is a non-ADA customer $U_1$. The partition position control module/unit 84 comprises computer program code that, responsive to the control signals generated by the control signal generation module/unit 82, configures processing circuitry 60 to control bagging section 40 to position the partition wall 46 between first and second positions so as to increase and decrease the maximum reach-depth of bagging section 40. The customer complete determination module/unit 86 comprises computer program code that when executed by processing circuitry 60, determines that the customer transaction has been complete, and in response, indicate that completion to the control signal generation module/unit 82.

The present embodiments may, of course, be carried out in ways other than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

What is claimed is:

1. A method of operating a self-checkout (SCO) station, the method implemented by the SCO station and comprising:
   determining that a user will be unable to reach all items in a bagging section of the SCO station, wherein the determining comprises detecting that a height of the user is in a first predefined range bounded by first and second height thresholds with the second height threshold being greater than the first height threshold; and
   responsive to the determining, automatically decreasing a maximum reach-depth of the bagging section from a first depth in which the user will be unable to reach all the items in the bagging section to a second depth in which the user will be able to reach all the items in the bagging section.

2. The method of claim 1 wherein determining that the user will be unable to reach all the items in the bagging section further comprises detecting an absence of the user in a space above the second height threshold.

3. The method of claim 1 wherein determining that the user will be unable to reach all the items in the bagging section is further based on determining an identity of the user.

4. The method of claim 3 wherein determining the identity of the user comprises:
  obtaining information about the user responsive to the user scanning a loyalty card; and
  identifying the user based the information.

5. The method of claim 3 wherein determining the identity of the user comprises identifying the user based on analyzing an image of the user.

6. The method of claim 3 wherein determining the identity of the user comprises identifying the user based on information received from a mobile device associated with the user.

7. The method of claim 1 wherein automatically decreasing the maximum reach-depth of the bagging section comprises automatically repositioning a partitioning member disposed in the bagging section from a first position in which the maximum reach-depth of the bagging section is equal to the first depth to a second position in which the maximum reach-depth of the bagging section is equal to the second depth.

8. The method of claim 7 wherein automatically repositioning the partitioning member comprises pivoting the partitioning member from the first position to the second position.

9. The method of claim 7 wherein automatically repositioning the partitioning member comprises extending the partitioning member upwardly from the first position to the second position.

10. The method of claim 7 wherein automatically repositioning the partitioning member comprises moving the partitioning member from the first position along a surface of the bagging section to the second position.

11. The method of claim 1 further comprising increasing the maximum reach-depth of the bagging section from the second depth to the first depth responsive to determining that another user would be able to reach all the items in the bagging section when the maximum reach-depth is equal to the first depth.

12. A self-checkout (SCO) station comprising:
  a terminal section configured to scan items selected by a user;
  a reconfigurable bagging section disposed adjacent the terminal section and configured to:
    receive the items scanned by the user; and
    automatically decrease a maximum reach-depth of the bagging section from a first depth in which the user is unable to reach all the items in the bagging section to a second depth in which the user is able to reach all the items in the bagging section; and
  processing circuitry configured to determine that the user will be unable to reach all items in the bagging section of the SCO station based on detecting that a height of the user is in a first predefined range bounded by first and second height thresholds with the second height threshold being greater than the first height threshold.

13. The SCO station of claim 12 wherein the processing circuitry is further configured to determine that the user will be unable to reach all items in the bagging section of the SCO station based on detecting an absence of the user in a space above the second height threshold.

14. The SCO station of claim 12 wherein the processing circuitry is configured to:
  determine an identity of the user based on one or more of:
    information received from a mobile device associated with the user;
    information obtained from a loyalty profile associated with the user; and
    information obtained from an analysis of a captured image of the user; and
  determine that the user will be unable to reach all items in the bagging section based on the identity of the user.

15. The SCO station of claim 12 wherein the bagging section comprises a partitioning member configured to move between first and second positions.

16. The SCO station of claim 15 wherein the partitioning member is configured to pivot between the first and second positions.

17. The SCO station of claim 15 wherein the partitioning member configured to extend upwardly from the first position to the second position, and to retract from the second position to the first position.

18. The SCO station of claim 15 wherein the partitioning member is configured to move along a surface of the bagging section between the first and second positions.

19. The SCO station of claim 12 wherein the processing circuitry is communicatively connected to the bagging section, and wherein the processing circuitry is further configured to generate one or more control signals that decrease the maximum reach-depth of the bagging section from the first depth to the second depth.

20. A non-transitory computer readable medium comprising executable program code that, when executed by a processing circuit of a self-checkout (SCO) station, causes the processing circuit to:
  determine whether a user will or will not be able to reach all items in a reconfigurable bagging section based on detecting that a height of the user is in a first predefined range bounded by first and second height thresholds with the second height threshold being greater than the first height threshold; and
  responsive to determining that the user will not be able to reach all items in a reconfigurable bagging section, automatically adjust a maximum reach-depth of the bagging section between a first depth in which the user is unable to reach all the items in the bagging section and a second depth in which the user is able to reach all the items in the bagging section.

* * * * *